(12) United States Patent  (10) Patent No.: US 6,667,759 B2
Gerszberg et al.  (45) Date of Patent: *Dec. 23, 2003

(54) VIDEO PHONE FORM FACTOR

(75) Inventors: Irwin Gerszberg, Kendall Park, NJ (US); Jeffrey S. Martin, Dover, NJ (US); Hopeton S. Walker, Haledon, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,583

(22) Filed: Dec. 31, 1997

(65) Prior Publication Data

US 2002/0149670 A1 Oct. 17, 2002

(51) Int. Cl.⁷ ................................................. H04N 7/14
(52) U.S. Cl. .............................. 348/14.01; 348/14.03; 348/14.07
(58) Field of Search .................... 379/93.17, 93.23, 379/435, 436, 53; 348/10, 12, 14–17, 836–837, 838–839; 345/905, 902, 501, 507, 503, 126; 248/917–924; 364/708.01; 312/313; 358/400, 42; 361/680–683; 708/140; 455/556

(56) References Cited

U.S. PATENT DOCUMENTS

| | | | | |
|---|---|---|---|---|
| 4,258,387 A | * | 3/1981 | Lemelson et al. | 348/14.01 |
| 4,291,198 A | * | 9/1981 | Anderson et al. | 379/93.17 |
| 4,456,925 A | | 6/1984 | Skerlos et al. | 348/552 |
| 4,620,289 A | | 10/1986 | Chauvel | 345/513 |
| 4,718,740 A | * | 1/1988 | Cox | 312/313 |
| 4,725,694 A | * | 2/1988 | Auer et al. | 345/902 |
| 4,916,441 A | | 4/1990 | Gombrich | 345/169 |
| 5,014,267 A | | 5/1991 | Tompkins et al. | 370/259 |
| 5,128,662 A | * | 7/1992 | Failla | 345/905 |
| 5,157,717 A | | 10/1992 | Hitchcock | 379/93.12 |
| 5,175,672 A | * | 12/1992 | Conner et al. | 345/905 |
| 5,179,367 A | * | 1/1993 | Shimizu | 345/905 |
| 5,335,276 A | | 8/1994 | Thompson et al. | 379/201 |
| 5,335,321 A | * | 8/1994 | Harney et al. | 345/503 |
| 5,374,952 A | * | 12/1994 | Flohr | 348/15 |
| 5,393,964 A | | 2/1995 | Hamilton et al. | 379/453 |
| 5,406,615 A | | 4/1995 | Miller, II et al. | 455/552 |
| 5,436,857 A | * | 7/1995 | Nelson et al. | 708/140 |

(List continued on next page.)

FOREIGN PATENT DOCUMENTS

| | | | | |
|---|---|---|---|---|
| EP | 0-456-248 A | * | 11/1991 | H04N/7/14 |
| EP | 0456248 | * | 11/1991 | 379/53 |
| JP | 01277079 A | * | 11/1989 | H04N/7/14 |
| JP | 04310053 A | * | 11/1992 | H04N/7/14 |
| JP | 05-011707 | * | 1/1993 | 345/905 |

Primary Examiner—George Eng

(57) ABSTRACT

A flat screen videophone has a microprocessor card located behind the video display, and an associated keyboard, and can be supported for convenient use in a variety of locations, such as on a wall, under a cabinet or shelf, or on a desk or counter. Wall-mounted versions suspend the keyboard on an adjustable bracket which holds the keyboard in an oblique use position, or in a storage position flat against the wall below the videophone housing. On under-cabinet versions the bracket-mounted keyboard can be swung behind the housing for storage, while the housing can be slid to the rear for storage, or swung upwardly for storage. Desk-top models have one or more cradles for storing the keyboard flat against the housing.

The housing can support peripheral devices, such as a printer, a scanner or a fax machine. Other devices may include a microphone, a camera, a motion sensor, a light sensor, a card reader, a telephone handset, and loudspeakers.

6 Claims, 10 Drawing Sheets

U.S. PATENT DOCUMENTS

| | | | |
|---|---|---|---|
| 5,488,412 A | 1/1996 | Majeti et al. | 348/10 |
| 5,512,935 A | 4/1996 | Majeti et al. | 348/10 |
| 5,534,913 A | 7/1996 | Majeti et al. | 348/12 |
| 5,546,316 A | 8/1996 | Buckley et al. | 364/479.03 |
| 5,561,604 A | 10/1996 | Buckley et al. | 364/479.05 |
| 5,572,005 A | 11/1996 | Hamilton et al. | 379/91.01 |
| 5,583,965 A | 12/1996 | Douma et al. | 704/275 |
| 5,584,054 A | 12/1996 | Tyneski et al. | 455/566 |
| 5,587,735 A | 12/1996 | Ishida et al. | 339/100.15 |
| 5,604,341 A * | 2/1997 | Grossi et al. | 235/379 |
| 5,619,684 A | 4/1997 | Goodwin et al. | 395/500 |
| 5,621,539 A * | 4/1997 | Brown et al. | 358/400 |
| 5,644,628 A | 7/1997 | Schwarzer et al. | 379/93.19 |
| 5,646,819 A * | 7/1997 | Hill, III | 361/683 |
| 5,668,570 A * | 9/1997 | Ditzik | 345/905 |
| 5,671,267 A | 9/1997 | August et al. | 348/10 |
| 5,682,195 A | 10/1997 | Hendricks et al. | 348/12 |
| 5,684,918 A | 11/1997 | Abecassis | 386/83 |
| 5,748,441 A * | 5/1998 | Loritz et al. | 345/905 |
| 5,821,987 A * | 10/1998 | Larson | 379/93.17 |
| 5,831,817 A * | 11/1998 | Chang | 345/905 |
| 5,850,230 A * | 12/1998 | San et al. | 345/501 |
| 5,901,204 A * | 5/1999 | Gallacher et al. | 379/93.17 |
| 5,946,055 A * | 8/1999 | Rosen | 348/837 |
| 5,963,245 A * | 10/1999 | McDonald | 348/14 |
| 5,986,634 A * | 11/1999 | Alioshin et al. | 345/126 |
| 6,163,257 A * | 12/2000 | Tracy | 340/506 |
| 6,215,515 B1 * | 4/2001 | Voois et al. | 379/93.21 |

* cited by examiner

VIDEO PHONE FORM FACTOR

TECHNICAL FIELD

This invention relates to videophones and, more particularly, to space-saving videophones adapted for convenient use in a variety of locations.

BACKGROUND

As deregulation of the telephone industry continues and as companies prepare to enter the local telephone access market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital switch.

A major problem with this configuration is that interexchange carriers attempting to penetrate the local telephone company's territory must lease trunk lines from the local telephone company switch to the interexchange company's network for digital traffic. Furthermore, the Internet service provider must lease a modem from the local phone company in the DSLAM switch and route its data through the local phone company's digital switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, the DSL modem provided by the local telephone company must also be provided to the end user in the customer premises equipment (CPE) in order to ensure compatibility. Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. Existing videophones either make use of large and bulky desktop computer monitors, or are rather large and bulky stand-alone units that take up considerable desk or counter space. This invention addresses the need for greater compactness and versatility in videophones.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a videophone and/or other devices to provide new services to an end user; an intelligent services director (ISD) disposed at or near the customer's premises for multiplexing and coordinating many digital services onto a single twisted-pair line; a facilities management platform (FMP) disposed in the local telephone network's central office for routing data to an appropriate interexchange company network; and a network server platform (NSP) coupled to the FMP for providing new and innovative services to the customer and for distinguishing services provided by the interexchange companies from those services provided by the local telephone network.

As part of this system, the invention provides a space-saving flat screen videophone which can be mounted in many convenient locations, and has functional features which make it a highly versatile telecommunications tool.

In accordance with one aspect of the invention, the videophone has a housing, a substantially flat panel video display of the front of the housing, a microprocessor card in the housing behind the video display, and means for mounting the housing on a substantially vertical surface, such as a wall. An adjustable bracket secures an associated keyboard to the housing.

For alternate mounting under a substantially horizontal surface, such as a cabinet or a shelf, the videophone according to the invention includes a housing support which suspends the housing below the horizontal surface. In these suspended embodiments, the bracket-supported keyboard can be stored behind the housing, and the housing either slid back to a storage position, or pivoted upwardly to a storage position.

For desktop support, the videophone according to the invention has a support base. The keyboard can be stored in a cradle either at the front of the housing, or at the rear.

The microprocessor card for the videophone preferably is a plug-in unit, which is accessible through an access opening in the housing.

The videophone also can be mated with one or more housing-supported peripheral devices, such as a printer, a scanner a facsimile machine or a postage meter. It also may be equipped with various built-in devices, such as a microphone, a camera, a motion sensor, a light sensor, a card reader, a telephone handset, or a loudspeaker.

BRIEF DESCRIPTION OF THE DRAWING

The foregoing summary of the invention, as well as the following detailed description of preferred embodiments, is better understood when read in conjunction with the accompanying drawing figures, which are included by way of example, and not by way of limitation with regard to the claimed invention.

DETAILED DESCRIPTION

Figure 1:
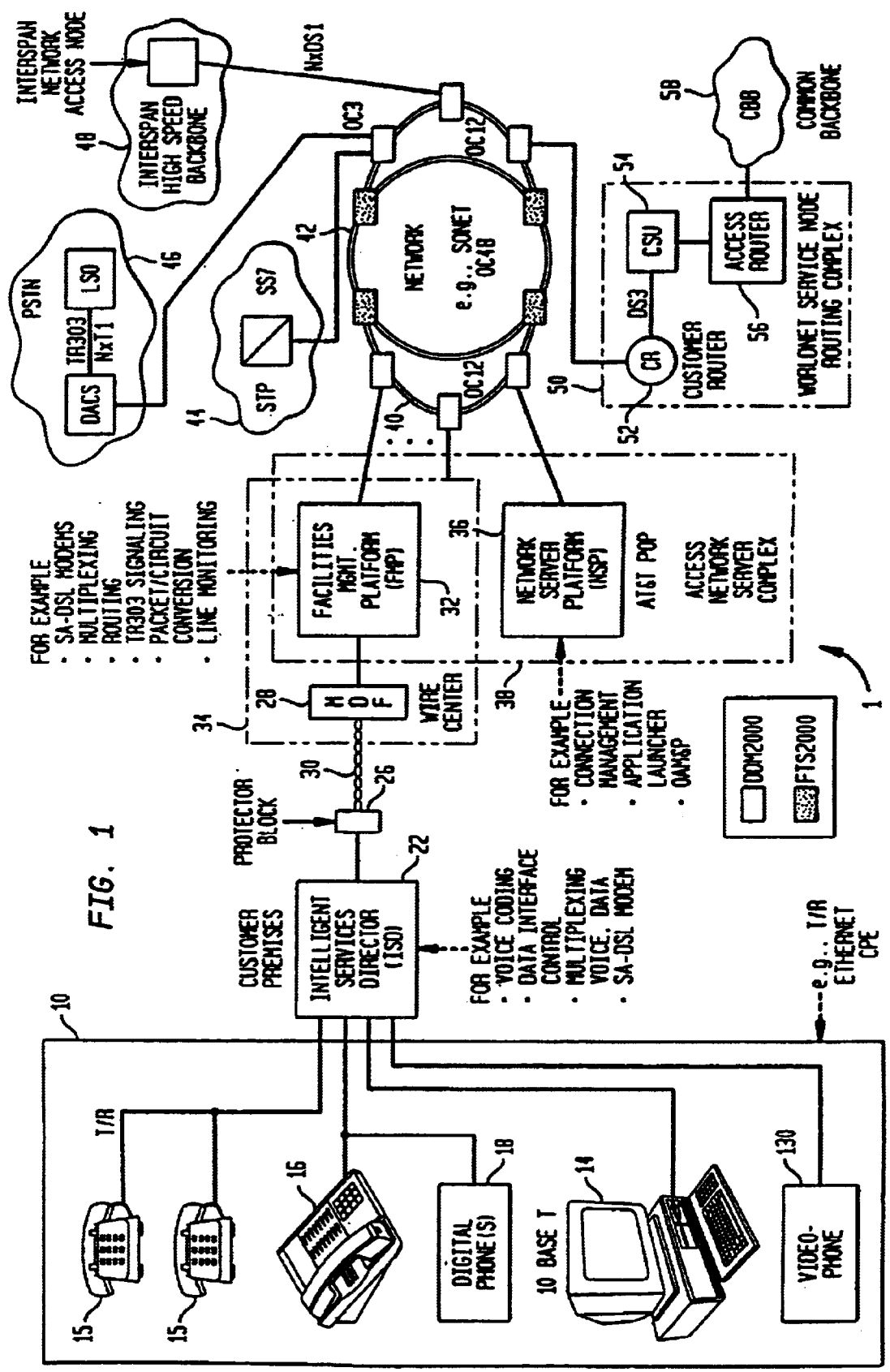
FIG. 1 illustrates an embodiment of a hybrid fiber twisted pair local loop architecture.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber-optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
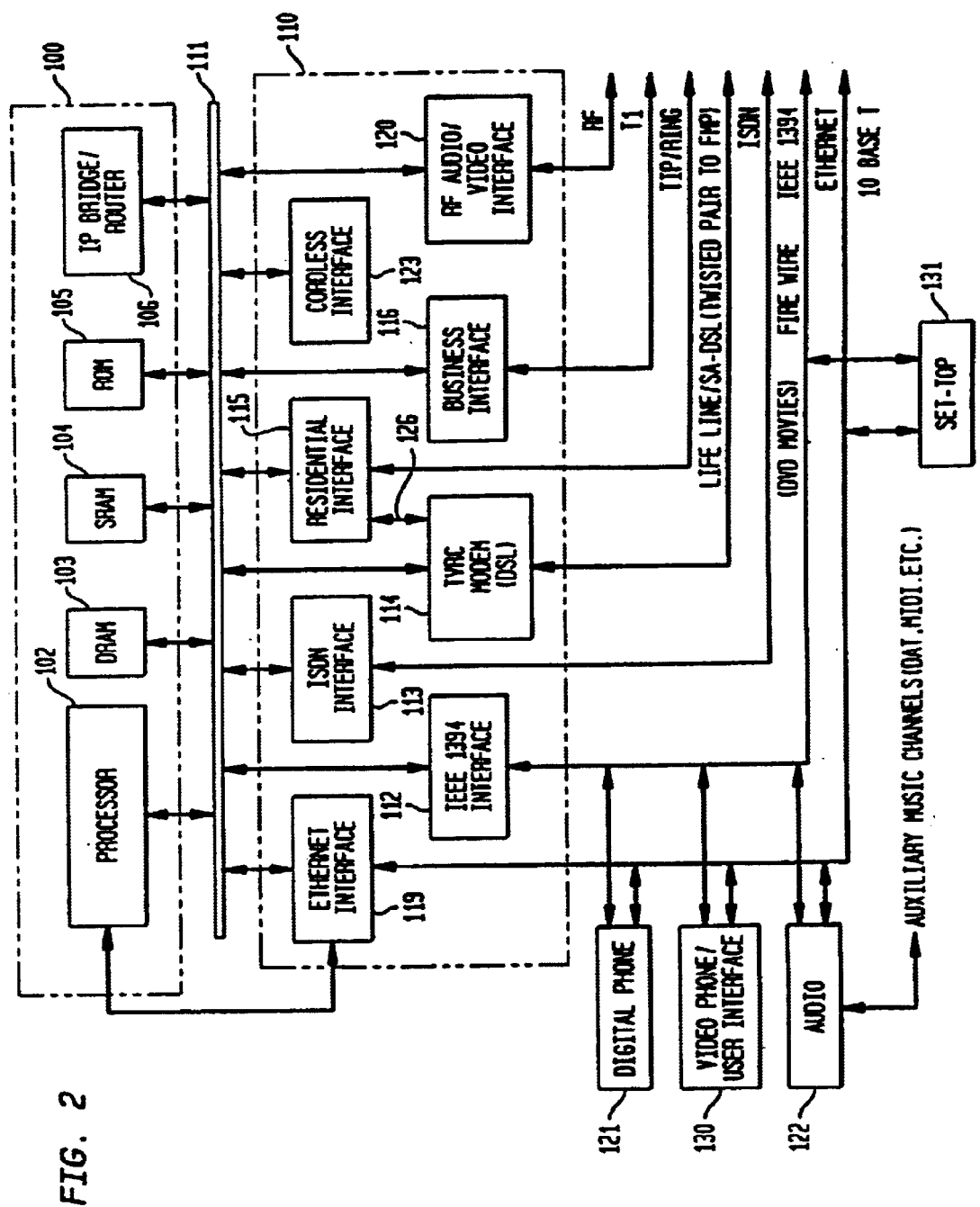
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/energy management facilities (not shown), facsimile devices 16, personal computers 14, and/or other digital or analog devices. Some or all of these devices may be connected with the ISD 22 via any suitable mechanism such as a single and/or multiple twisted-pair wires fiber and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an internet protocol (IP) bridge router 106 connecting the controller 100 to a system bus 111. The system bus 111 may be connected with a variety of network interface devices 110. The network interface devices 110 may be variously configured to include an integrated services digital network (ISDN) interface 113, an Ethernet interface 119 (e.g., 10 Base T, 100 Base T, etc.), an IEEE 1394 "fire wire" interface 112 (e g., for a digital videodisc device (DVD)), a digital subscriber line TVRC modem interface 114) (DL interface (e.g., a a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on an audio interface 122, videophone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogramed to provide the digital audio channels at a particular time, such as a wake up call for bedroom mounted telephone, or elsewhere in the house. The user may select any number of services on the videophone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the videophone/user interface 130, digital phones, 121 and/or another suitable device such as a set-top device 131.

In further embodiments, the ISD 22 may be configured as an IP proxy server such that each of the devices connected to the server utilizes transmission control protocol/internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the video telephone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
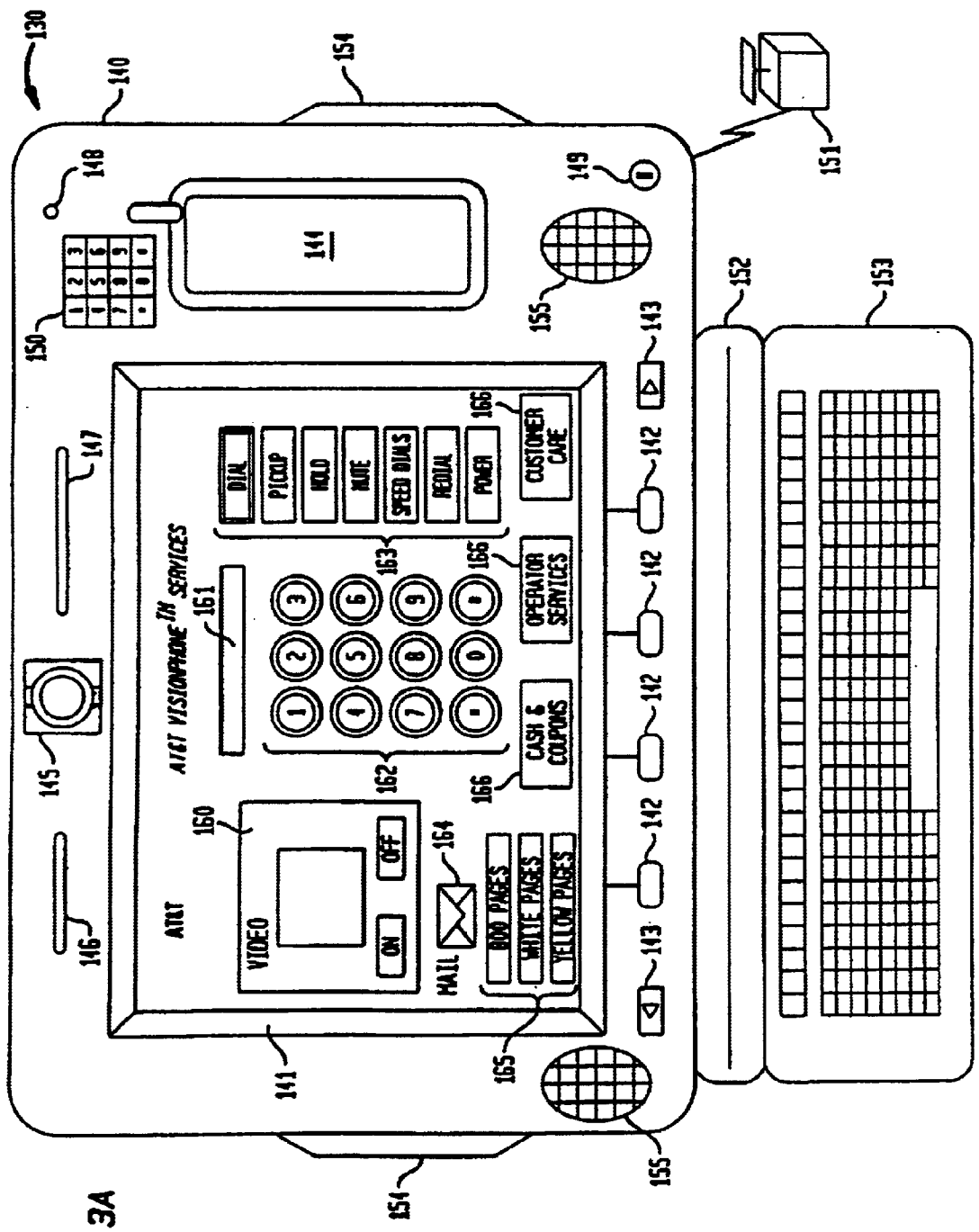
FIGS. 3A and 3B illustrate an embodiment of a videophone consistent with the architecture shown in FIG. 1.
Figure 3B:
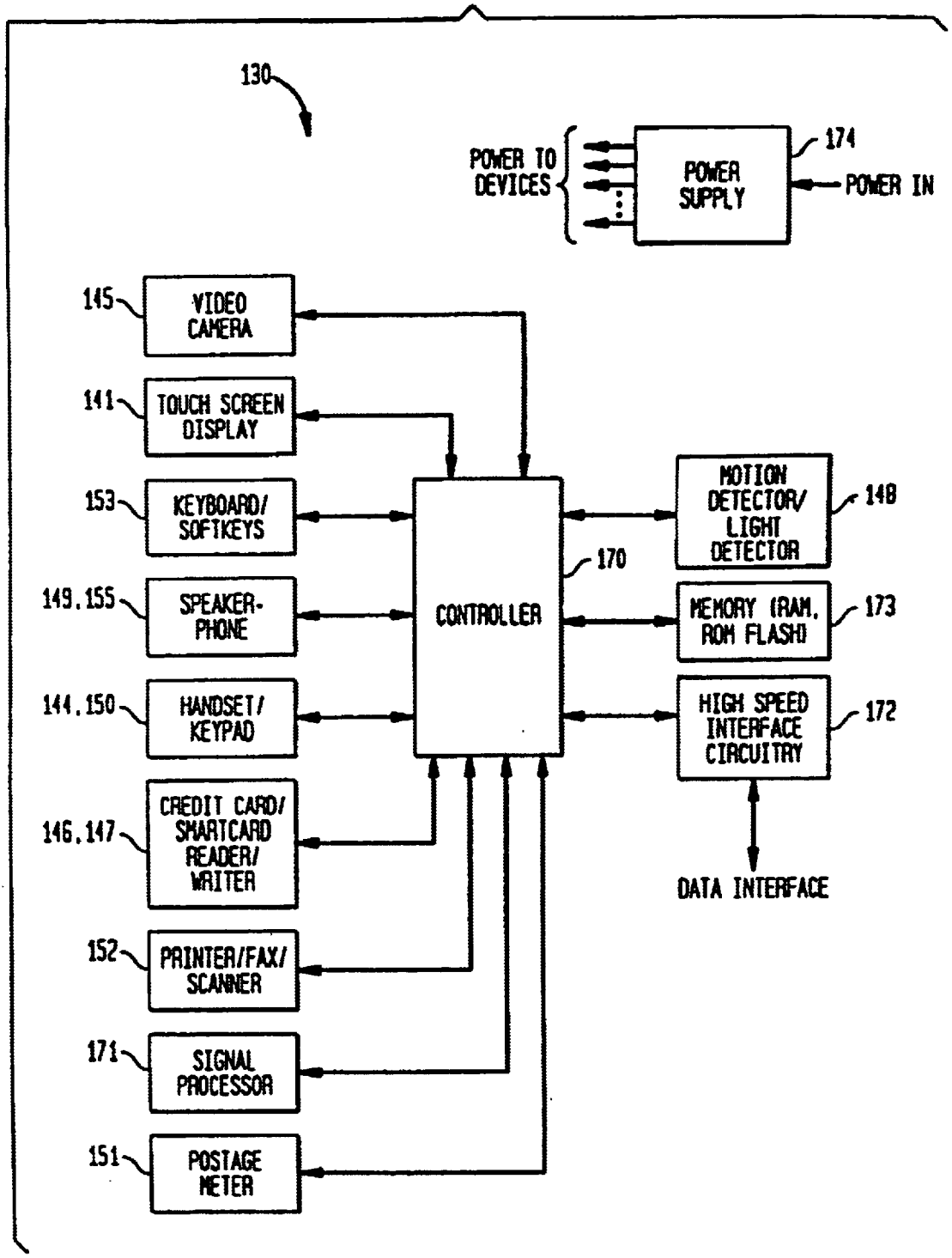

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the videophone unit is shown in FIG. 3B. Referring to FIG. 3B, in addition to the items above, the videophone 130 may also include a signal processor 171, high speed interface circuitry 172, memory 173, power supply 174, all interconnected via a controller 170.

When the videophone 130 is used as a video telephone, the display 141 may include one or more video window(s) 160 for viewing a person to whom a user is speaking and/or showing the picture seen by the person on the other end of the videophone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the videophone in accordance with one or more of the applications incorporated by reference below.

Figure 4A:
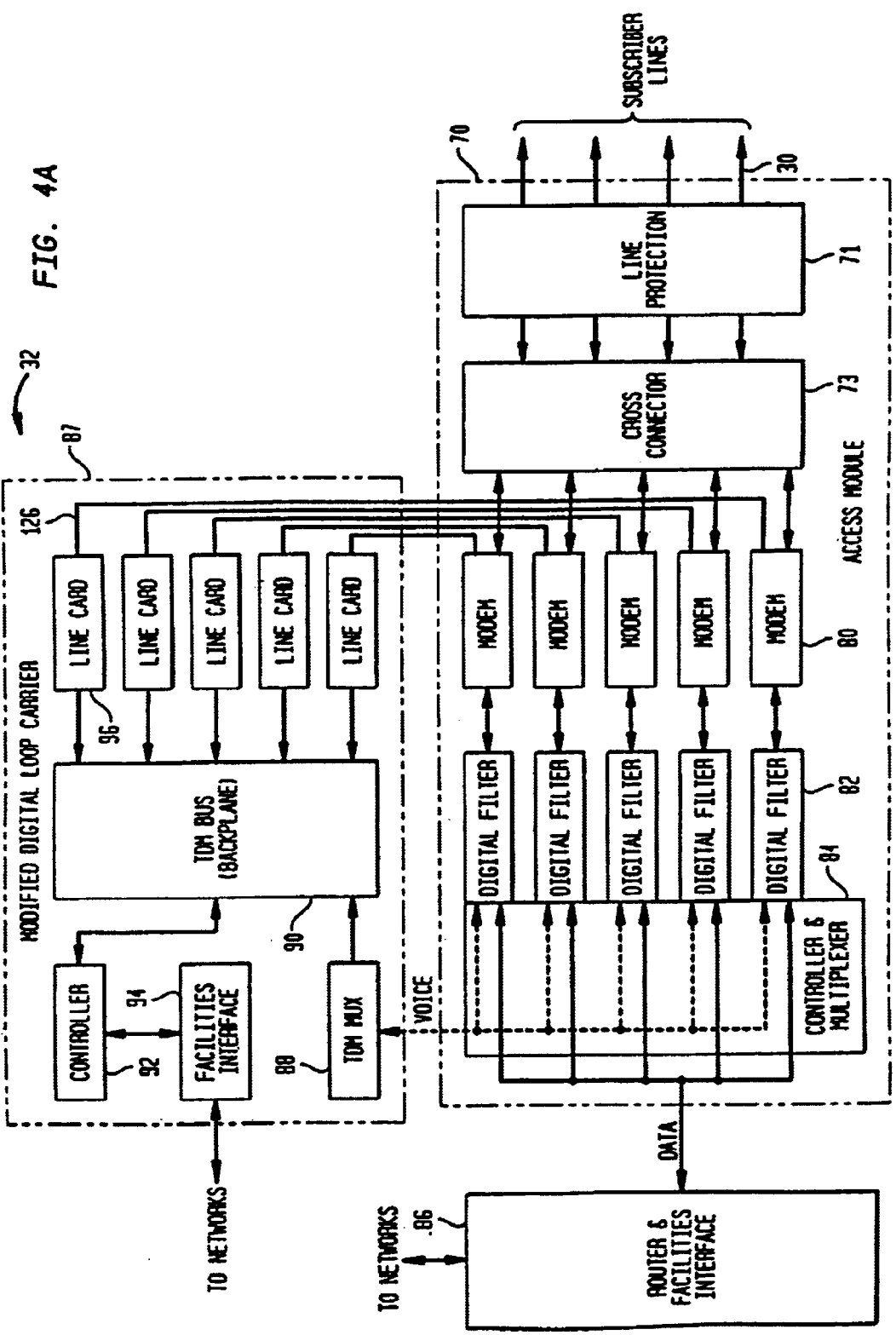
FIG. 4A is a block diagram of an embodiment of a facilities management platform consistent with the architecture shown in FIG. 1.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexor (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexor 84 and the digital filters 82. The digital filters 82 may separate the voice signals from the digital data signals, and the controller multiplexor 84 may then multiplex the voice signals and/or data signals received from the digital filters 82. The controller multiplexor 84 may then send multiplexed voice signals to the TDM MUX 88 and the data signals to the router and facilities interface 86 for transmission to one or more external networks. The TDM MUX 88 may multiplex the voice signals from the controller multiplexor 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexer 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
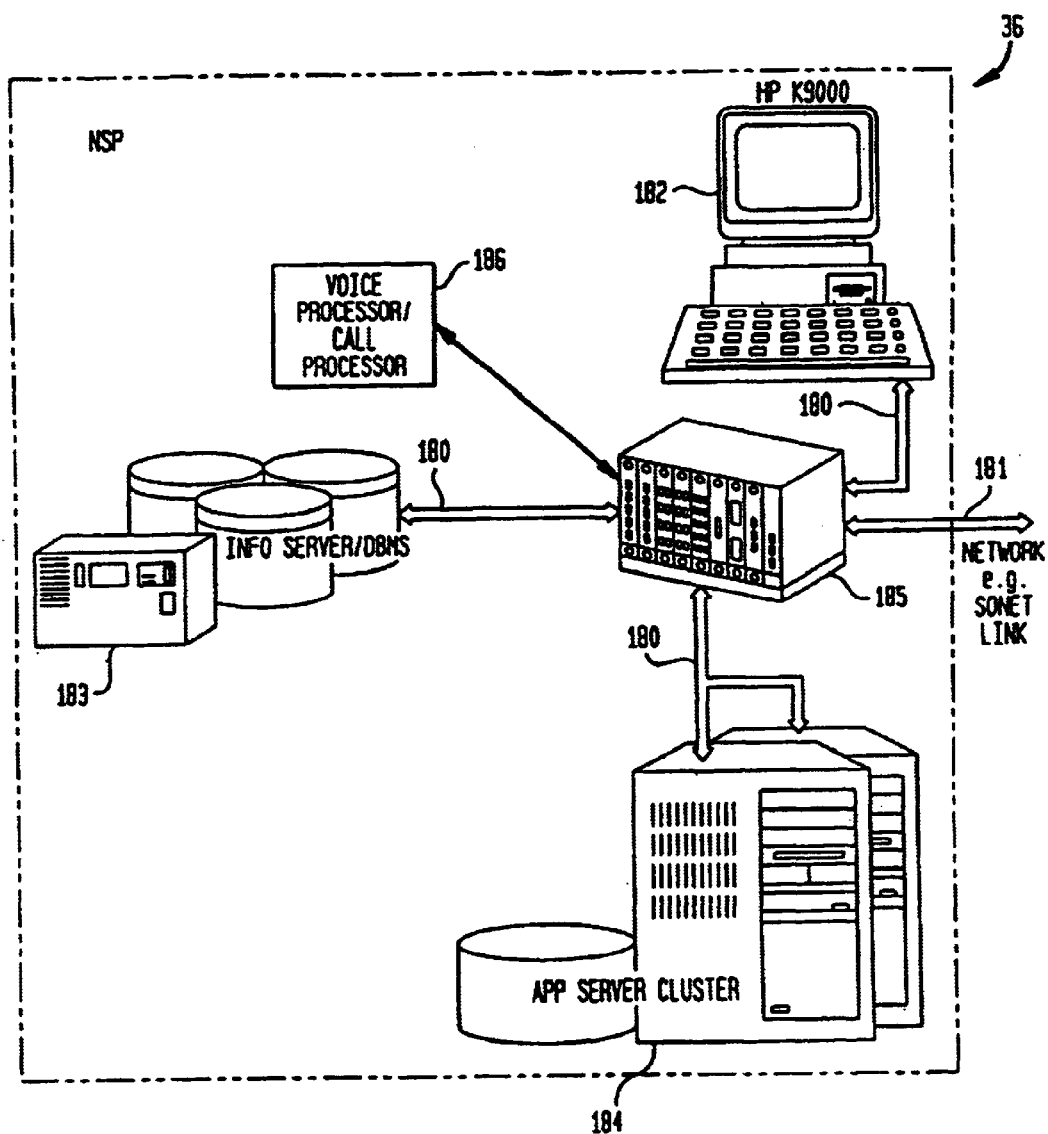
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

Figure 5:
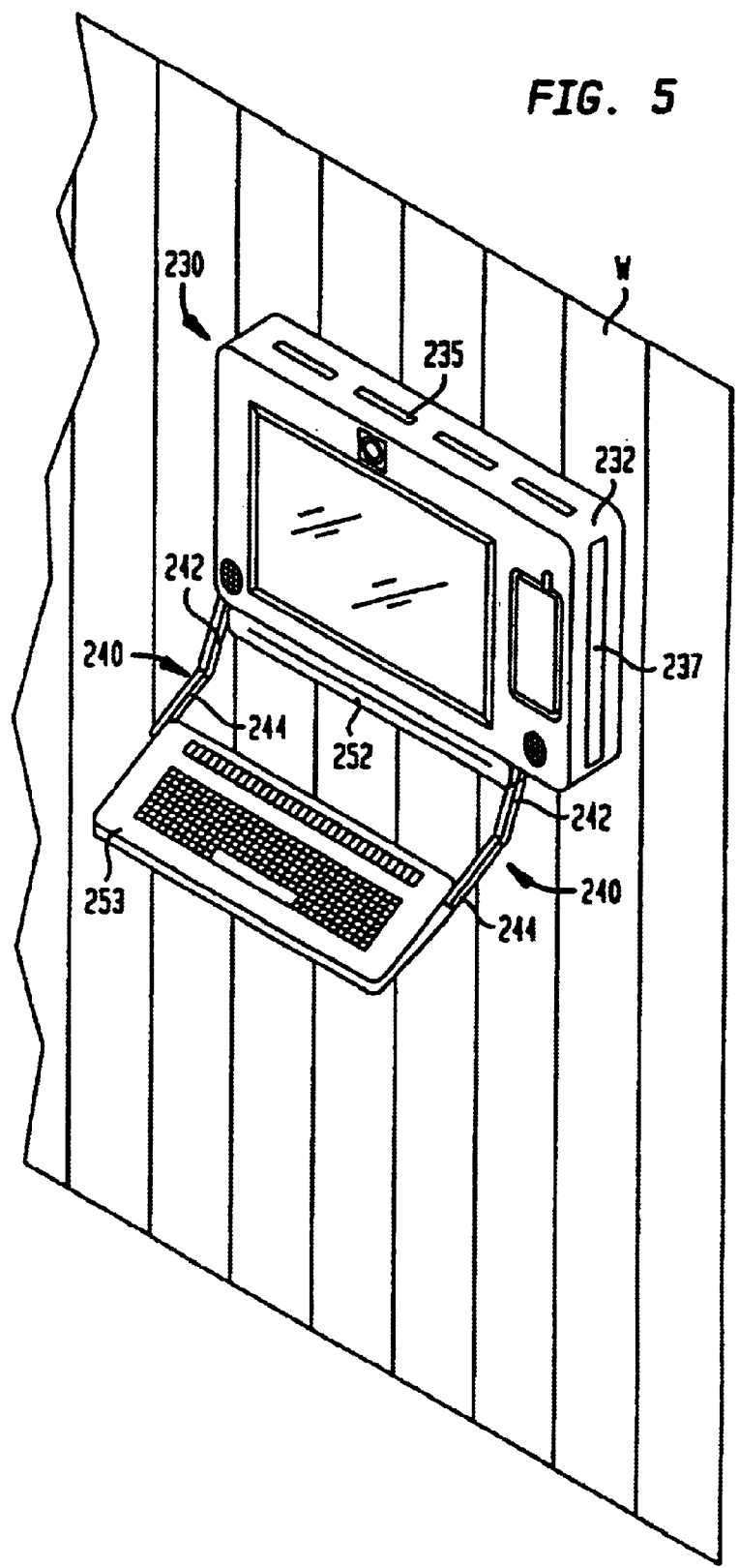
FIG. 5 is a perspective view of a videophone according to the invention mounted on a wall.
Figure 6:
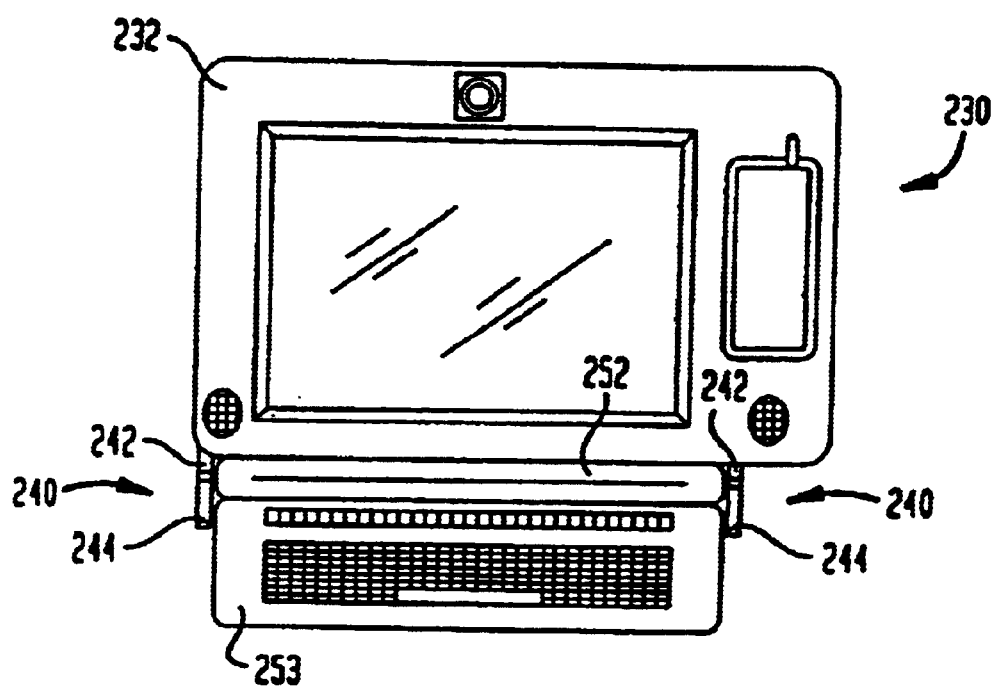
FIG. 6 is a front elevational view of the videophone of FIG. 5.
Figure 7:
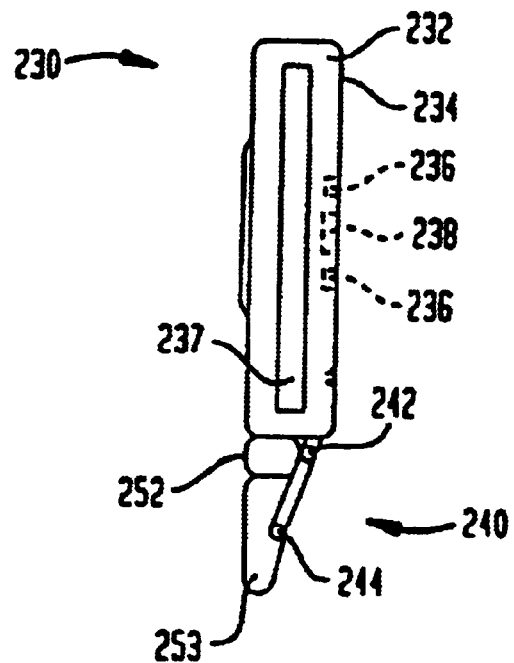
FIG. 7 is a side elevational view of the videophone of FIG. 5.

FIGS. 5–7 depict a videophone 230 which is adapted for mounting on a wall W or any other substantially vertical surface, such as a cabinet. The videophone may have all of the features shown in FIGS. 3A and 3B, including a printer/scanner/facsimile 252, and similarly is paired with a keyboard 253. The rear face 234 of videophone housing 232 is substantially flat, and is here shown equipped with a standard wall phone mount, which includes a pair of vertically spaced keyholes 236 for receiving the mating studs of a standard telephone wall plate (not shown), and a central recess 238 with a standard RJ-11 jack. Any other suitable means may be used for removably mounting housing 232 on the wall, including but not limited to brackets, cradles, frames, screws, clamps, etc. Cooling vents 235 along the top of housing 232 afford ventilation for the internal electronics. An access cover 237 on the right side of housing 232 covers an access opening through which the plug-in microprocessor card can be removed or inserted.

Keyboard 253 is suspended from housing 232 on a pair of articulated, adjustable brackets 240. Brackets 240 position and support keyboard 253 in a substantially vertical storage position below the housing 232 and printer/scanner/facsimile 252 (FIG. 7), and in an oblique operative position in front of and below the housing (FIG. 5). Each bracket 240 is shown having two articulated links 242, 244. These links are joined by a frictional pivot, and lower link 244 is frictionally pivoted to keyboard 253. These frictional pivots maintain the links and the keyboard in set positions, but yield to moderate manual force so that the position of keyboard 253 easily can be adjusted. Frictional adjustment may be afforded by threaded knobs at each pivot (not shown), in a known manner. Each upper link 242 pivots and slides (not shown) within housing 232. When keyboard 253 is to be stored, links 242 retract into housing 232, while the same links extend from the housing when the keyboard is deployed for use.

The support for keyboard 253 may take any form as long as it positions and supports the keyboard in the described positions. This would include any form of bracket at each end of the keyboard, or a single central bracket which supports the entire keyboard. Alternatively, the keyboard may be held in a tray or rack which itself is adjustably suspended from the housing.

Figure 8:
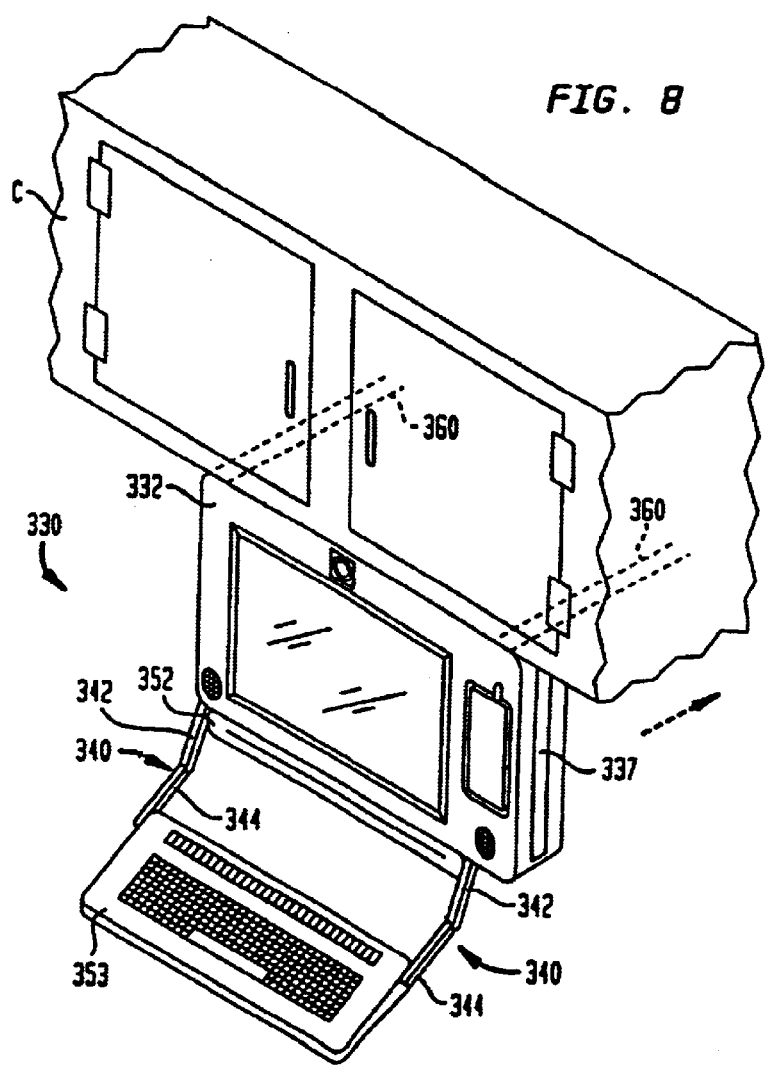
FIG. 8 is a perspective view of a videophone according to the invention mounted under a cabinet.
Figure 9A:
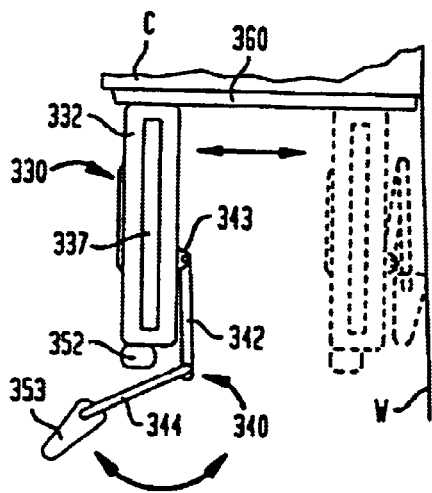
FIG. 9a is a side elevational view of the videophone of FIG. 8 showing one mounting configuration.
Figure 9B:
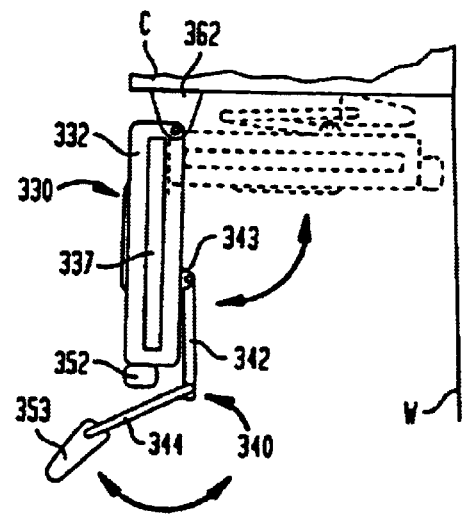
FIG. 9b is a side elevational view of the videophone of FIG. 8 showing another mounting configuration.

FIGS. 8, 9a and 9b depict a videophone 330 which is adapted for mounting below a substantially horizontal surface, such as beneath a cabinet C or shelf. The videophone may have all of the features shown in FIGS. 3A and 3B, including a printer/scanner/facsimile 352, and similarly is paired with a keyboard 353. Also included are cooling vents (not shown) along the top of housing 332, and a microprocessor card access port closed by a cover 337.

In the embodiment shown in FIGS. 8 and 9a, the top of housing 332 is secured to and suspended from the movable elements of a pair of under-cabinet slides 360. This enables videophone 330 to slide between a use position near the front edge of cabinet C (shown in solid lines in FIG. 9a), and a rear storage position adjacent wall W (shown in dotted lines in FIG. 9a). When in the use position, a suitable brake or lock (not shown) prevents the videophone from sliding backward.

Alternatively, the top of housing 332 may be pivoted to cabinet C in brackets 362 (FIG. 9b) such that the videophone may be pivoted upwardly to a storage position against the bottom of the cabinet (shown in dotted lines in FIG. 9(b). Here, too, a suitable brake or lock (not shown) prevents movement of the videophone from its use position, and also prevents the videophone from dropping from its storage position. Any other form of housing support may be used as long as it affords a similar degree of support, and storage away from the front edge of the cabinet or shelf.

In the embodiments shown in FIGS. 8, 9a and 9b, keyboard 353 is adjustably suspended from housing 332 on adjustable brackets 340 in a manner similar to that used in the wall-mounted embodiment of FIGS. 5–7. Here, however, the upper link 342 of each bracket 340 simply is pivoted to a bracket 343 on the rear of housing 332, and the keyboard is stored behind the housing, with links 342, 344 folded adjacent one another. Any other keyboard support may be used as long as it affords a similar degree of support, adjustment and storage.

Figure 10:
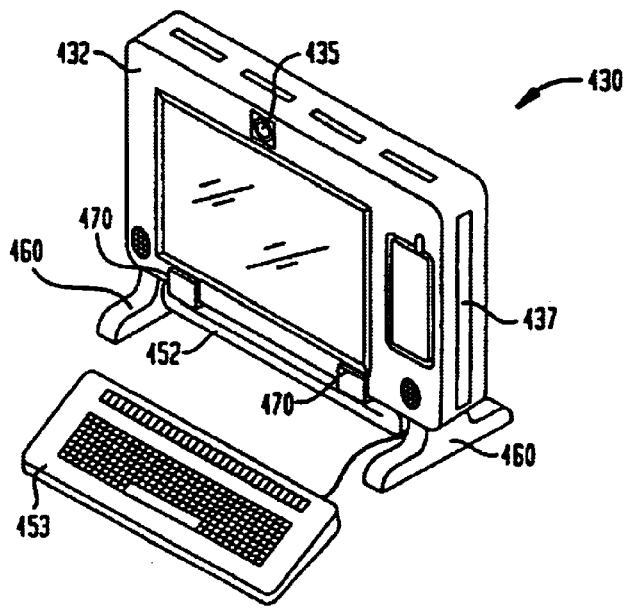
FIG. 10 is a perspective view of the videophone according to the invention supported on a horizontal surface, such as a desktop.
Figure 11:
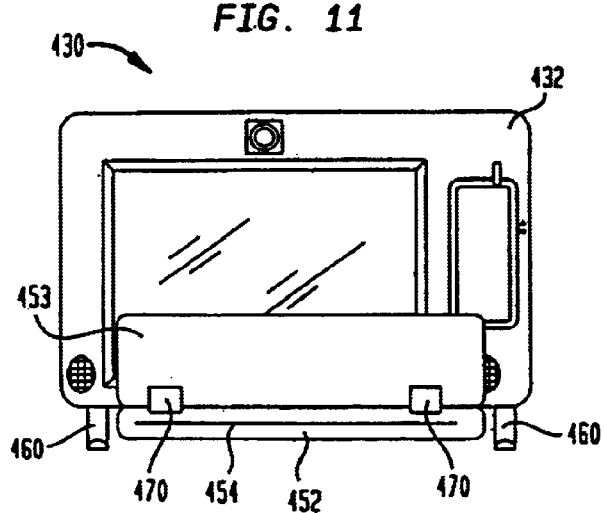
FIG. 11 is a front elevational view of the videophone of FIG. 10 showing the keyboard in one storage position.
Figure 12:
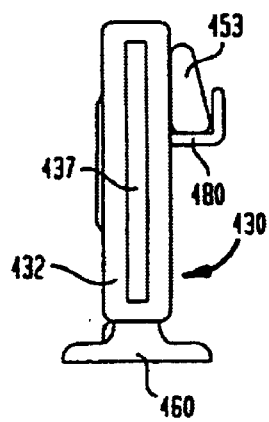
FIG. 12 is a side elevational view of a desk-supported videophone according to the invention showing the keyboard stored in an alternate position.

FIGS. 10–12 depict a videophone 430 which is adapted for mounting on a substantially horizontal surface, such as desk, table or counter. The videophone may have all of the features shown in FIGS. 3A and 3B, including a printer/scanner/facsimile 452, and similarly is paired with a keyboard 453. Also included are cooling vents 435 along the top of housing 432, and a microprocessor card access port closed by a cover 437. Here, videophone 430 is supported on a pair of feet 460, one near each side of housing 432.

When not in use, keyboard 453 may be stored vertically in front of housing 432 in a front cradle comprising two spaced L-shaped brackets 470 FIGS. 10, 11). These brackets are attached to housing 432 just above printer/scanner/facsimile 452, so that the document feed slot 454 of that peripheral device is not obstructed by the keyboard. Alternatively, housing 432 may be provided with a rear keyboard cradle comprising two spaced L-shaped brackets 480 (FIG. 12) which support the keyboard in a storage position behind the housing. The housing may be provided with both front and rear keyboard cradles to give the user two optional locations for storing the keyboard. The keyboard cradles may take any suitable form as long as they provide compact, substantially vertical support for the keyboard. For example, instead of using two discrete L-shaped brackets on either the front or the rear of housing 432, a single elongated L-shaped cradle may be provided.

In any of the configurations illustrated in FIGS. 5–12, peripheral devices, such as printer/scanner 252, 352, 452, may be mounted at any suitable location on the housing. For example, a combined printer/scanner may be mounted along the top of the housing instead of along the bottom. Another peripheral device may be mounted along the left side of the housing. Other combinations are considered to be encompassed within the invention as long as the generally flat configuration of the videophone is preserved.

The following applications, filed concurrently herewith, are hereby incorporated by reference:
1. A Hybrid Fiber Twisted-pair Local Loop Network Service Architecture (Ser. No. 09/001,360);
2. Dynamic Bandwidth Allocation for use in the Hybrid Fiber Twisted-pair Local Loop Network Service Architecture (Ser. No. 09/001,425);
3. The VideoPhone (Ser. No. 09/001,905);
4. VideoPhone Privacy Activator (Ser. No. 09/001,909);
5. VideoPhone Form Factor (Ser. No. 09/001,583);
6. VideoPhone Centrally Controlled User Interface With User Selectable Options (Ser. No. 09/001,516);
7. VideoPhone User Interface Having Multiple Menu Hierarchies (Ser. No. 09/001,353);
8. VideoPhone Blocker (Ser. No. 09/001,353);
9. VideoPhone Inter-com For Extension Phones (Ser. No. 09/001,358);
10. Advertising Screen Saver (53-17);
11. (Ser. No. 09/001,906);
12. VideoPhone Multimedia Announcement Answering Machine (Ser. No. 09/001,911);
13. VideoPhone Multimedia Announcement Message Toolkit (Ser. No. 09/001,345);
14. VideoPhone Multimedia Video Message Reception (Ser. No. 09/001,362);
15. VideoPhone Multimedia Interactive Corporate Menu Answering Machine Announcement (Ser. No. 09/001,675);
16. VideoPhone Multimedia Interactive On-Hold Information Menus (Ser. No. 09/001,356);
17. VideoPhone Advertisement When Calling Video Non-enabled VideoPhone Users (Ser. No. 09/001,361);
18. Motion Detection Advertising (Ser. No. 09/001,355);
19. Interactive Commercials (Ser. No. 09/001,578);
20. VideoPhone Electronic Catalogue Service (Ser. No. 09/001,421);
21. A Multifunction Interface Facility Connecting Wideband Multiple Access Subscriber Loops With Various Networks (Ser. No. 09/001,356);
22.;
23. Life Line Support for Multiple Service Access on Single Twisted-pair (Ser. No. 09/001,434);
24. A Network Server Platform (NSP) For a Hybrid Fiber Twisted-pair (HFTP) Local Loop Network Service Architecture (Ser. No. 09/001,582);
25. A Communication Server Apparatus For Interactive Commercial Service (Ser. No. 09/001,344);
26. NSP Based Multicast Digital Program Delivery Services (Ser. No. 09/001,580);
27. NSP Internet, JAVA Server and VideoPhone Application Server (Ser. No. 09/001,354);
28. NSP WAN Interconnectivity Services for Corporate (Ser. No. 09/001,359);
29. NSP Telephone Directory White-Yellow Page Services (Ser. No. 09/001,540);
30. NSP Integrated Billing System For NSP services and Telephone services (Ser. No. 09/001,359);
31. Network Server Platform/Facility Management Platform Caching Server (Ser. No. 09/001,419);
32. An Integrated Services Director (ISD) Overall Architecture (Gerszberg 72-36-22-12);
33. ISD/VideoPhone (Customer Premise) Local House Network (Ser. No. 09/001,418);
34. ISD Wireless Network (Ser. No. 09/001,363);
35. ISD Controlled Set-Top Box (Ser. No. 09/001,458);
36. Integrated Remote Control and Phone (Ser. No. 09/001,423);
37. Integrated Remote Control and Phone User Interface (Ser. No. 09/001,420);
38. Integrated Remote Control and Phone Form Factor (Ser. No. 09/001,410);
39. VideoPhone Mail Machine (Attorney Docket No. 3493.73170);
40. Restaurant Ordering Via VideoPhone (Attorney Docket No. 3493.73171);

41. Ticket Ordering Via VideoPhone (Attorney Docket No. 3493.73712);
42. Multi-Channel Parallel/Serial Concatenated Convolutional Codes And Trellis Coded Modulation Encode/Decoder (Ser. No. 09/001,342);
43. Spread Spectrum Bit Allocation Algorithm (Ser. No. 09/001,842);
44. Digital Channelizer With Arbitrary Output Frequency (Ser. No. 09/001,581);
45. Method And Apparatus For Allocating Data Via Discrete Multiple Tones (Ser. No. 09/001,167);
46. Method And Apparatus For Reducing Near-End Cross Talk In Discrete Multi-Tone Modulators/Demodulators (Ser. No. 09/001,176).

In addition, the following two patent applications are hereby incorporated by reference:
1. U.S. patent application Ser. No. 08/943,312 filed Oct. 14, 1997 entitled Wideband Communication System for the Home, to Robert R. Miller, II and Jesse E. Russell, and
2. U.S. patent application Ser. No. 08/858,170, filed May 14, 1997, entitled Wide Band Transmission Through Wire, to Robert R. Miller, II, Jesse E. Russell and Richard R. Shively.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A videophone comprising:
   a housing having a front surface and a substantially flat rear face, at least a portion of said front surface including a substantially flat panel touch screen video display comprising at least one video window for viewing an image corresponding to a signal received from a remote videophone terminal, a virtual touch keypad for inputting a telephone number by touching the video display with a dialed-telephone number window for displaying the inputted telephone number, and a plurality of virtual buttons for performing various telecommunications functions spaced from said keypad, wherein the image in the video window and the virtual keypad are simultaneously displayed on said substantially flat panel touch screen video display during the operation of the videophone;
   a controller in said housing, said controller causing said image to e received by the video window in response to the signal from the remote videophone being received by said videophone;
   a plug-in microprocessor card insertable in said housing behind said video display and operatively coupled to said controller;
   a keyboard operatively connected to said microprocessor card, an at least one adjustable bracket securing said keyboard to said housing wherein said bracket adjustably positions said keyboard in a range from a storage position below said housing and substantially vertical, to an oblique operative position in front of and below said housing; and
   a mounting structure for removably mounting said housing on a substantially vertical surface.

2. A videophone according to claim 1 further comprising a peripheral device suspended from the bottom of said housing and operatively connected to said microprocessor card, said keyboard, when in its storage position, being located below said peripheral device.

3. A videophone comprising:
   a housing have a depth substantially less than the width and the height thereof, said housing including a front surface with at least a portion thereof including a substantially flat panel touch screen video display comprising a display window for displaying an image corresponding to a signal received from a remote videophone terminal received by said videophone and a virtual keypad for inputting a telephone number, wherein said display window and virtual touch keypad are simultaneously displayed on said substantially flat panel touch screen video display during the operation of said videophone;
   a controller in said housing, said controller causing said image to e received by the video window in response to the signal from the remote videophone being received by said videophone;
   a plug-in microprocessor card insertable in said housing behind said video display and operatively coupled to said controller;
   a keyboard operatively connected to said microprocessor card, an at least one cradle on said housing for supporting said keyboard in a substantially flat storage position against said housing; and
   a base at the bottom of said housing for supporting said housing generally upright on a substantially horizontal surface.

4. A videophone according to claim 3 wherein said at least one cradle comprises a front cradle located on the front of said housing below said video display.

5. A videophone according to claim 4 further comprising a peripheral device at the bottom of said housing and operatively connected to said microprocessor card, said peripheral device having a horizontal document feed slot at the front thereof, and said front cradle supporting said keyboard above said document feed slot.

6. A videophone according to claim 4 wherein said at least one cradle comprises a rear cradle on the rear of said housing.

* * * * *